Aug. 6, 1940.   C. H. RUMPEL   2,210,732
REGULATED RECTIFIER SYSTEM
Filed April 21, 1938
FIG.1
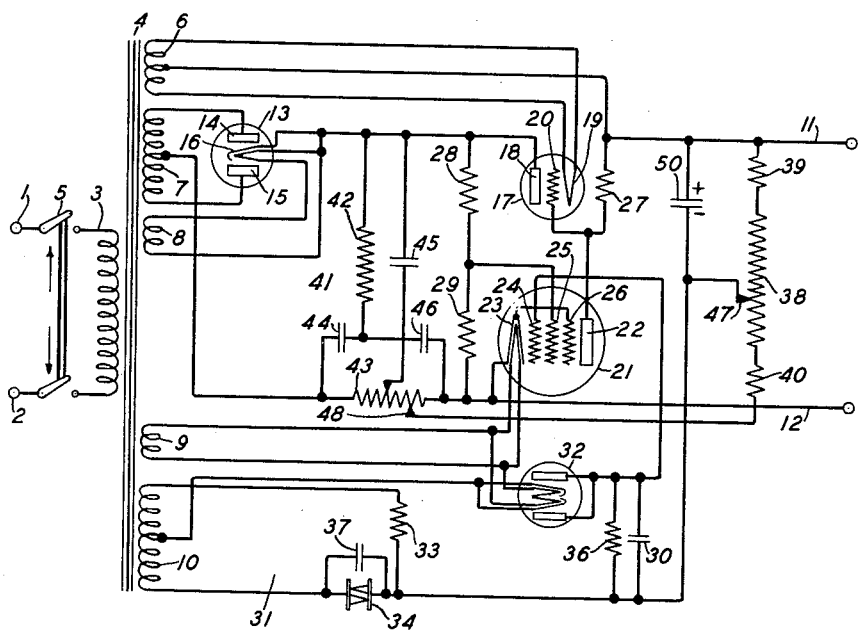
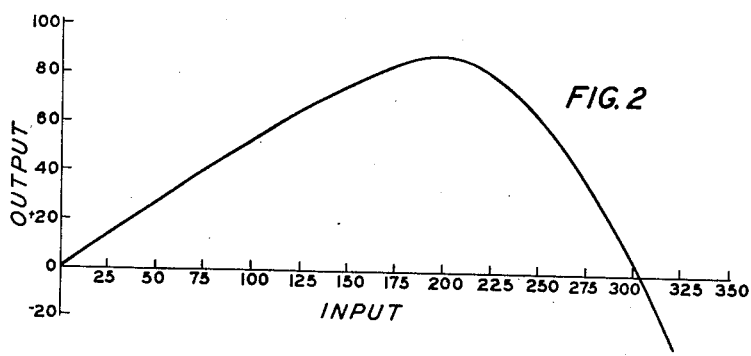
FIG. 2
INVENTOR
C. H. RUMPEL
BY Wayne B Wells
ATTORNEY Patented Aug. 6, 1940

2,210,732

UNITED STATES PATENT OFFICE 2,210,732

REGULATED RECTIFIER SYSTEM

Carl H. Rumpel, Jackson Heights, N. Y., assignor to Bell Telephone Laboratories, Incorporated, New York, N. Y., a corporation of New York Application April 21, 1938, Serial No. 203,225

10 Claims. (Cl. 171—312)

This invention relates to rectifier systems and particularly to regulated rectifier systems.

One object of the invention is to provide a regulated rectifier system that shall maintain the voltage of a direct current load circuit constant in an improved manner.

Another object of the invention is to provide a regulator for maintaining constant voltage on a direct current load circuit that shall employ a reference direct-current voltage obtained from an alternating current supply circuit.

Another object of the invention is to provide a bridge circuit having one arm composed of a resistance element having a non-linear resistance characteristic and two opposite vertices connected to an alternating current supply circuit with rectifying storing means connected to the other two bridge vertices for supplying a standard reference voltage to a voltage regulator.

A further object of the invention is to provide a regulated rectifier system for supplying a direct current load circuit with constant voltage from an alternating current supply circuit that shall obtain a constant direct current voltage from the supply circuit for opposing a voltage varying according to the load circuit voltage to govern the load circuit voltage.

In rectifier systems it is very desirable to maintain the rectified voltage substantially constant. The load circuit voltage should be maintained constant irrespective of changes in load on the load circuit or of changes in voltages on the alternating current supply circuit. It is generally desirable to have the load circuit voltage remain constant with changes in load. In special instances it may be desirable to have the regulation of the load circuit voltage operate with a rising or a lowering characteristic in place of a flat characteristic.

In a regulated rectifier system constructed in accordance with the invention two space discharge devices which may be vacuum tubes or gas-filled tubes are connected between an alternating current supply circuit and a direct current load circuit to supply full wave rectified current to the load circuit. The voltage on the direct current load circuit is maintained constant under control of a potential varying according to the load circuit voltage and a constant reference voltage obtained from the alternating current supply circuit. Control of the voltage on the direct current load circuit is also obtained according to the load so that regulation of the load circuit voltage may be obtained with a flat, rising or lowering characteristic.

In the rectifier system employed to describe the invention, an alternating current supply circuit is connected to a direct current load circuit by means of a full wave rectifier. Preferably the rectifier is in the form of a space discharge device and may be either a gas-filled tube or a vacuum tube. A power vacuum tube illustrated as having three electrodes is connected in one side of the direct current load circuit, in order that the impedance of the power device may be controlled to govern the load circuit voltage. The grid of the power or control device is governed by means of a pentode tube connected across the load circuit. The control grid of the pentode is governed according to variations in voltage on the load circuit beyond the power tube therein. The voltage having variations in accordance with the variations of the load circuit voltage is impressed on the control grid from the pentode in opposition to a reference voltage, in order to effect a change in the impedance of the power tube more than proportional to the load circuit voltage variations.

The reference voltage which is employed to impress a bias on the grid of the detector pentode is obtained from the alternating current supply circuit by means of a bridge. The bridge is formed with one resistance arm having a non-linear resistance characteristic. Preferably the non-linear resistance arm is formed of silicon carbide crystals and a binder material, which material is disclosed in the patent to K. B. McEachron 1,822,742, September 8, 1931. It is to be understood, however, that the non-linear resistance arm may also be formed of copper oxide rectifier elements or any other suitable material having like characteristics, if so desired. Two opposite vertices for the bridge are connected to the alternating current supply circuit and the other two vertices of the bridge are connected to a condenser by means of a suitable rectifier. A bridge of the type above described will have a maximum voltage output for each cycle of the alternating current. This maximum voltage for each cycle of the alternating current is rectified and stored in the condenser to supply a reference voltage which is constant irrespective of the variations in the voltage of the supply circuit. A bridge of the above-indicated type will increase in voltage to a maximum and decrease thereafter, irrespective of the changes in voltage on the supply circuit. The reference voltage supplied by the condenser opposes the variable voltage obtained from the load circuit and is less than the variable voltage obtained from the load circuit. By referring the variable load circuit voltage to a reference voltage, it is possible to obtain a voltage change which is more than proportional to the changes in voltage on the load circuit.

In order to compensate the regulator operation and obtain flat regulation the drop across a resistance in the load circuit is used to supply a potential varying according to the load for opposing the variable voltage which is impressed on the control grid of the pentode. The compensating resistance may be made of such size as to effect operation of the regulator with a flat rising or lowering characteristic. The voltage at which the load circuit voltage is held constant by the regulator may be varied by controlling the value of the variable voltage which is impressed on the control grid of the pentode.

In the accompanying drawing, Fig. 1 is a diagrammatic view of a regulated rectified system constructed in accordance with the invention; and Fig. 2 is a curve showing the relation of the input voltage to the output voltage on the bridge circuit shown in Fig. 1.

Referring to Fig. 1 of the drawing, two alternating current supply conductors 1 and 2 are connected to the primary winding 3 of a transformer 4 by means of a suitable switch 5. The transformer 4 is provided with five secondary windings 6, 7, 8, 9 and 10. The secondary winding 7 is connected to a direct current load circuit comprising conductors 11 and 12 by means of a space discharge rectifier 13 comprising two anodes 14 and 15 and a cathode 16. Anodes 14 and 15 of the rectifier device 13 are connected to opposite terminals of the secondary winding 7. The cathode 16 is connected to the load conductor 11 and a mid-tap from the secondary winding 7 is connected to the load circuit conductor 12. The cathode 16 is heated by a filament connected to the secondary winding 8 of the transformer 4.

In order to control the voltage supplied by the rectifier to the load circuit, a power space discharge device 17 is connected in series with one side of the load circuit. The power device 17 is shown comprising an anode 18, a cathode 19 and a control grid 20. The cathode or filament 19 is heated by means of the secondary winding 6.

A detector space discharge device 21 in the form of a pentode is provided for controlling the potential impressed on the grid of the power device 17, in order to vary the impedance of the power device and control the voltage on the load circuit. The pentode detector device 21 comprises an anode 22, a cathode 23, a control grid 24, a screen grid 25 and a suppressor grid 26. The cathode 23 is heated by a filament connected to the secondary winding 9 of the transformer 4. The anode 22 and the cathode 23 of the detector device 21 are connected across the load circuit in series with a coupling resistance 27. The input circuit for the power device 17 is connected across the coupling resistance 27 so that the impedance of the power device 17 varies according to the operation of the detector device 21. The screen grid 25 is connected between resistance elements 28 and 29 which are connected across the load circuit. A suppressor grid is connected to the cathode 23. The control grid 24 of the detector device 21 is governed in accordance with the voltage variations across the load circuit beyond the power device 17 and is compensated in accordance with a voltage which varies according to the load on the load circuit. A reference voltage is also impressed on the control grid of the detector device 21, in order to effect change in the operation of the detector device more than proportional to any voltage change that may take place on the load circuit.

The reference voltage which is impressed on the control grid 24 is obtained from a condenser 30. The condenser 30 is connected to a bridge 31 by means of a suitable rectifier device 32. The bridge 31 has two arms formed by the secondary winding 10 of the transformer 4, a resistance arm 33 and an arm 34 having a non-linear resistance characteristic. Preferably the arm 34 is formed of silicon carbide crystals with a binder material. The resistance of the arm 34 as compared with the resistance of the arm 33 is made very large at zero for small currents. As the input voltage applied to the bridge by the transformer 4 increases, the resistance of the arm 34 decreases in the manner of the material disclosed in the above-mentioned patent to K. B. McEachron 1,822,742. The curve shown in Fig. 2 of the drawing indicates the character of the output that may be obtained from a bridge of the above-indicated character. The abscissae for the curve in Fig. 2 indicate the voltage input to the bridge and the ordinates for the curve in Fig. 2 indicate the voltage output from the bridge. The curve in Fig. 2 shows that the voltage output from the bridge rises to a maximum peak voltage and then decreases. This maximum voltage output from the bridge is constant and is employed to supply a constant reference voltage. The output vertices of the bridge are connected to the condenser 30 in circuit with the rectifier 32. The condenser will be charged to a potential corresponding to the maximum voltage output from the bridge 31. A resistance element 36 is connected across condenser 30 in order to provide a slow discharge path. A condenser 37 is connected across the resistance arm 34 of the bridge 31, in order to improve the operating characteristics of the bridge.

A voltage divider comprising a resistance element 38 is connected in series with resistance elements 39 and 40 between the load conductor 11 and a point on the resistance element 43. The voltage divider 38 supplies a potential which varies according to variations in the load circuit voltage.

A resistance condenser filter 41 is connected across the load circuit adjacent to the rectifier 13. The filter comprises resistance elements 42 and 43 and capacity elements 44, 45 and 46. The resistance element 43 is in series with the load conductor 12 and is employed to obtain a potential varying according to the load to compensate the regulator operation.

The input circuit for the detector device 21 may be traced from the adjustable contact 47 of the voltage divider 38 through the condenser 30, grid 24, cathode 23, a portion of the resistance element 43, contact 48, resistance 40 and voltage divider 38 to the contact 47. The constant reference charge on the condenser 30 opposes the variable charge obtained from the voltage divider 38 to impress a potential on the control grid 24 which varies more than proportionally to the voltage variations of the load circuit. The potential drop across a portion of the resistance 43 serves to compensate the regulating operation and opposes the action of a variable voltage obtained from the load circuit. The contact member 46 on the resistance 43 may be varied to obtain regulation with a flat, rising or lowering characteristic. The contact 47 on the voltage divider 38 may be varied to adjust the voltage at which the load circuit voltage is held constant. A condenser 50 is connected between the load circuit conductor 11 and the contact 47 to increase the rapidity with which the circuit maintains the voltage of the load circuit constant upon sudden changes in load and line voltages. This results in additional smoothing of the rectified alternating current.

If the voltage across the load conductors 11 and 12 tends to go above normal value, the voltage across the voltage divider 38 will be increased to increase the positive potential impressed on the grid 24 of the detector tube 21. An increase in the positive potential on the grid 24 increases the voltage drop across coupling resistance 27. An increase in the voltage drop across the coupling resistance 24 increases the negative potential on the grid 20 of the power tube 17. Accordingly, the impedance of the power tube 17 is increased to lower the voltage across supply conductors 11 and 12. An opposite effect takes place if the voltage across supply conductors 11 and 12 is reduced below normal value. The voltage obtained from the potentiometer 38 is in each case opposed by the constant reference voltage supplied by the condenser 30 and the compensating voltage obtained from the resistance element 43.

Modifications in the system and an arrangement in the location of parts may be made within the spirit and scope of the invention. Such modifications are intended to be covered by the appended claims.

What is claimed is:

1. In combination a direct current load circuit, a control space discharge device in said load circuit, means comprising a regulator space discharge device having a control grid for governing the impedance of said control device, a bridge circuit having one arm formed of a material having a non-linear resistance characteristic, a source of alternating current connected to two opposite vertices of said bridge, rectifying means and a condenser connected in series to the other two bridge vertices for maintaining a constant voltage charge on the condenser, and means for impressing on said grid a voltage varying according to the load voltage and opposed by the charge on said condenser to govern the regulator device and maintain the load circuit voltage constant.

2. In combination a direct current load circuit, a control space discharge device in said load circuit, means comprising a regulator space discharge device having a control grid for governing the impedance of said control device, a bridge circuit having one arm formed of a material having a non-linear resistance characteristic, a source of alternating current connected to two opposite vertices of said bridge, means connected to the other two vertices of said bridge to obtain and store a reference constant voltage, and means for impressing on said grid a voltage varying according to the load circuit voltage and opposed by said constant reference voltage to govern said regulator device and maintain the load circuit voltage constant.

3. In combination a direct current load circuit, a control space discharge device in said load circuit, a regulator space discharge device having input and output circuits and a control grid, the output circuit of said regulator device being connected across the load circuit in series with a coupling resistance, means for controlling said control device according to the potential drop across said coupling resistance, a bridge circuit having one arm formed of a material having a non-linear resistance characteristic, a source of alternating current connected to two opposite vertices of said bridge, means connected to the other two vertices of said bridge to obtain and store a reference constant voltage, and means for impressing on said grid a voltage varying according to the load circuit voltage and opposed by said reference voltage to govern said regulator device and maintain the load circuit voltage constant.

4. In combination a direct current load circuit, a control space discharge device connected in series with said load circuit, means comprising a regulator space discharge device having a control grid for governing the impedance of said control device, a fixed standard voltage, a load resistance connected in series with one side of said load circuit for obtaining a voltage varying according to the load on the load circuit, a potential resistance connected between the other side of said load circuit and a point between the terminals of said load resistance, and means for connecting the input circuit of said regulator device between a point on said potential resistance and a terminal of said load resistance and in circuit with said standard voltage to impress a potential varying according to the load circuit voltage on said grid and in opposition to said standard voltage and the voltage varying according to the load, said means governing the regulator device and the control device to maintain the load circuit voltage constant while compensating for changes in load.

5. In combination a direct current load circuit, a control space discharge device in said load circuit, means comprising a regulator space discharge device having a control grid for governing the impedance of said control device, a bridge circuit having an arm formed of a material composed of silicon carbide crystal and a binder material, a source of alternating current connected to two opposite vertices of said bridge, rectifying means and a condenser connected in series to the other two bridge vertices for maintaining a constant voltage charge on the condenser, and means for impressing on said grid a voltage varying according to the load voltage and opposed by the charge on said condenser to govern the regulator device and maintain the load circuit voltage constant.

6. In combination a direct current load circuit, a control space discharge device connected in series with said load circuit, means comprising a regulator space discharge device for governing the impedance of said control device, said regulator device having a control grid, an alternating current supply circuit, a condenser, means connected to said supply circuit independently of said direct current circuit for charging said condenser with a constant standard direct current reference voltage, and means for impressing a potential on said grid varying according to the voltage on said load circuit and in opposition to said reference voltage.

7. In combination, a direct current load circuit, a control space discharge device connected in series with said load circuit, means comprising a regulator space discharge device for governing the impedance of said control device, said regulator device having a control grid, a supply circuit, means comprising a bridge circuit connected to said supply circuit for maintaining a constant voltage charge on a condenser, means for obtaining a voltage varying according to the load on the load circuit, and means for impressing a potential on said grid varying according to the load circuit voltage and in opposition to the charge on said condenser and the voltage varying with the load to govern the regulator device and the control device to maintain the load circuit voltage constant.

8. In a control circuit, a source of alternating current and means for deriving a constant fixed potential from said source of alternating current, said means comprising a bridge circuit energized from the source of alternating current and having an arm with a non-linear resistance characteristic and a resistance value relatively high compared to the other bridge arms when potential is applied to the bridge circuit so that the bridge circuit has an input-output voltage characteristic which rises from zero to a maximum fixed peak and then decreases towards zero, said source of alternating current having sufficient voltage to operate said bridge circuit over the maximum peak output of the characteristic curve for each cycle of the alternating current, and means for rectifying and storing the fixed peak voltage from said bridge circuit to provide a standard fixed reference potential.

9. In a control circuit, a source of alternating current and means for deriving a constant fixed potential from said source of alternating current, said means comprising a bridge circuit energized from the source of alternating current and having an arm composed of silicon carbide crystals and a binder material with a non-linear resistance characteristic and a resistance value relatively high compared to the other bridge arms when potential is applied to the bridge circuit so that the bridge circuit has an input-output voltage characteristic which rises from zero to a maximum fixed peak and then decreases towards zero, said source of alternating current having sufficient voltage to operate said bridge circuit over the maximum peak output of the characteristic curve for each cycle of the alternating current, and means for rectifying and storing the fixed peak voltage from said bridge circuit to provide a standard fixed reference potential.

10. In a control circuit, a source of alternating current and means for deriving a constant fixed potential from said source of alternating current, said means comprising a bridge circuit energized from the source of alternating current and having an arm with a non-linear resistance characteristic and a resistance value relatively high compared to the other bridge arms when potential is applied to the bridge circuit so that the bridge circuit has an input-output voltage characteristic which rises from zero to a maximum fixed peak and then decreases towards zero, said source of alternating current having sufficient voltage to operate said bridge circuit over the maximum peak output of the characteristic curve for each cycle of the alternating current, and means for rectifying and storing the fixed peak voltage from said bridge circuit to provide a standard fixed reference potential, said last-mentioned means comprising a condenser and a rectifier connected to the bridge output vertices.

CARL H. RUMPEL.